United States Patent Office 3,649,533
Patented Mar. 14, 1972

3,649,533
METHOD AND ARRANGEMENT FOR PURIFYING WATER DRAWN FROM A GROUND-WATER WELL
Yrjö Johannes Reijonen and Veli Elias Reijonen, both of Siltasaarenkatu 14A, Helsinki 53, Finland
Filed Feb. 4, 1970, Ser. No. 8,520
Claims priority, application Finland, Feb. 13, 1969, 453/69
Int. Cl. C02b 1/28
U.S. Cl. 210—50
2 Claims

ABSTRACT OF THE DISCLOSURE

The present invention concerns a method for purifying water drawn from a ground-water well, most suitably from a deep well, from iron by introducing in the water oxygen or an oxygen-releasing substance and by filtering to remove the iron oxide which is precipitated. The method is characterized in that into the ground water-carrying soil layer surrounding the well feed water is fed which contains oxygen or an oxygen-releasing substance.

---

Figure 1:
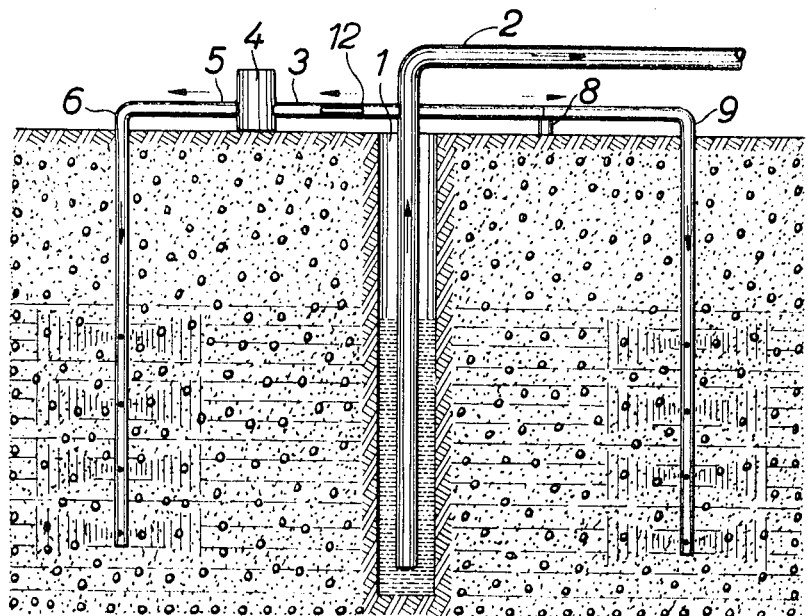

A ground-water well is here understood to mean such deep wells into which ground water flows in a region of great extension in the height dimension of the well, so that water is obtained in ample amount. From the well thousands of litres of water per minute may be obtained, and sometimes even tens of thousands of litres per minute. The water is drawn from the well with the aid of a pump and conducted to the point of consumption. Such wells are designated as deep wells (borehole wells) or pipe wells.

Sometimes the ground water is of such purity that no purifying plant is needed at all, and the water can be used as such. The worst impurity, and usually the only one which must be removed, consists of iron ions. For the purpose of their removal a purifying plant must be erected, in which there is added to the water either oxygen or some oxygen-releasing substance, which precipitates the iron in the form of iron oxide. The oxygen can be added to the water for instance, in the form of pure oxygen or by aerating the water in that it is caused to flow through a terraced structure.

The amount of oxygen needed to precipitate the iron ions is not great. Subsequent to precipitation of the iron oxide, the water is filtered, for instance, by causing it to pass through one or several sand layers. The cost of establishment of a purifying plant is high. In addition, operating costs arise from the use of the plant because the sand layers have to be regenerated from time to time in order to remove the precipitated iron oxide.

Now, it has been found that iron ions do not occur in the ground water in localities where rain water is able to penetrate and be introduced in the ground water. Rain water carries oxygen along with it, which in its turn precipitates the iron. In between soil layers distinct iron oxide-bearing, brown layers are often observable. On one side of such layers the ground water contains iron, while it is free of iron on the other side. The present invention is based on utilization of this observation. A method according to the invention is characterized in that into the soil layer surrounding the well and containing ground water there is fed feed water which contains oxygen or an oxygen-releasing substance. By this procedure, in a way, nature's own means are employed in order to purify the water. The feed water oxidizes the ground water and the precipitated iron oxide remains in the soil.

As has been mentioned before, the oxygen quantity required for precipitation of the iron is small. For this reason the amount of feed water is not great either. It has been found that the feeding of feed water can be discontinued even for periods of several months without incurring another rise of the iron content in the water drawn from the well to objectionable level.

According to an advantageous embodiment of the invention, into the ground water-carrying soil layer surrounding the well pipes are inserted through which feed water is fed in. In the event that the ground water has a certain direction of flow, the pipes may be placed on that side of the well from which the principal inflow of ground water takes place. It goes without saying that purification of ground water by this means is considerably less expensive, compared to the previously known method which involved the establishment of a special purifying plant.

It is advantageous if the feed water is taken by means of a branch pipe from the water drawn from the well, and to which oxygen or some oxygen-releasing substance is added.

According to one embodiment of the invention, the feed water is conducted by means of pressure into the deep well itself, from which it spreads into the surrounding ground water-carrying soil layer. In other words, in the standpipe coming from the well the direction of flow of the water is reversed, while at the same time oxygen or some oxygen-releasing substance is fed into the water. After oxygen has been conducted in this manner into the ground water-carrying soil layer surrounding the well, iron-free water may be drawn from the well during a period of several months, before it is necessary to introduce oxygen once more.

The invention also covers an arrangement for application of the method. The arrangement is characterized in that it comprises pipes extending into the ground water-carrying soil layer surrounding the well, and a pump for the purpose of feeding feed water through these pipes.

According to an advantageous embodiment of the arrangement, the intake side of the pump has been connected by means of a branch tube to the water-drawing pipe of the well and on the intake or delivery side of the pump a device has been placed for the purposes of adding oxygen or some oxygen-releasing substance to the feed water. The device for adding oxygen or some oxygen-releasing substance may consist, for instance, of a pipe from an oxygen flask or air compressor.

Figure 2:
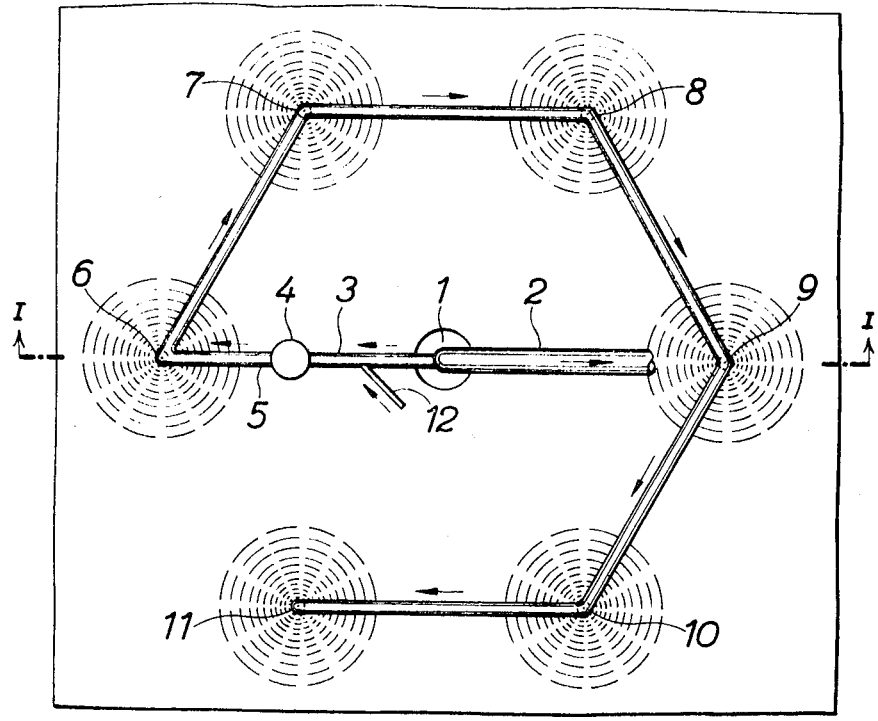

The invention is described, for the sake of an example, in the following with reference to the attached drawing, in which FIG. 1 shows a well and its surrounding soil in vertical section, FIG. 2 shows the same as viewed from above.

Water flows into the well 1 from the surrounding, ground water-carrying soil layers. From the well 1, the standpipe 2 departs, through which water is conducted to the point of consumption. The pump for drawing water may be located either in the well itself or at some other point along the pipe 2.

From the pipe 2, the branch pipe 3 goes to the pump 4, which feeds feed water through the pipe 5 into the vertical pipes 6–11, which extend into the soil layer containing ground water which surrounds the well. The distance of the pipes 6–11 from the well 1 is a few metres or some tens of metres, depending on the type of soil around the well. To the branch pipe 3 the pipe 12 has been connected, through which into the feed water oxygen or an oxygen-releasing substance is conducted. In the event that for purification of the ground water some chemicals are required, these too may be introduced by the pipe 12. Such chemicals are, for instance, sodium hydroxide and soda, which neutralize the ground water. The water must be neutral in order that it might not again by corrosion take up iron e.g. from the pipe system. The neutralizing chemicals also decompose free carbonic acid, whereby carbon dioxide and oxygen are obtained, which latter again in its turn precipitates iron.

In case the principal direction of flow of the ground water in FIG. 2 is, for instance, from top to bottom of the figure, the pipes 10 and 11, and perhaps also pipes 6 and 9, may be entirely omitted.

It is obvious to anyone skilled in the art that various embodiments of the invention may vary within the scope of the claims presented below.

What is claimed is:

1. Improvement in a method for removing iron drawn from the ground water carrying soil layer in a ground water well and particularly from a deep well by the introduction of oxygen or an oxygen-releasing substance into the water and by removing the precipitated iron oxide by filtering, wherein the improvement comprises withdrawing water from the ground water well, adding oxygen or an oxygen-releasing substance to the water removed and recirculating the ground water containing oxygen or an oxygen-releasing substance into the ground water carrying soil layer in at least one location spaced laterally a sufficient distance from the well to permit filtering of the iron precipitates.

2. An arrangement for removing iron from water drawn from the ground water-carrying soil layer of a ground water well and particularly from a deep well by adding oxygen or an oxygen-releasing substance into the water and removing the precipitated iron oxide by filtering, wherein the improvement comprises a plurality of pipes spaced laterally from the ground water well and extending downwardly into the ground water-carrying soil layer surrounding the well, a pump connected to said pipes for feeding water into the ground water-carrying soil layer, a branch pipe being connected between the ground water well and said pump for supplying water withdrawn from the well into said pump, and a device located on the intake side of the pump for adding oxygen or an oxygen-releasing substance to the water being recirculated from the ground water well into said pipes, said pipes being spaced from the well a sufficient distance to permit filtering of the iron precipitates.

References Cited

Bennison, E. W., Fundamentals of Water Well Operation, etc., Jour. AWWA, vol. 45, March 1953, pp. 252–258 (Copy in Gp. 176).

Russell, Robert H. Artificial Recharge of a Well, etc., Jour. AWWA, vol. 52, November 1960, pp. 1427–1437 (Copy in Gp. 176).

MICHAEL ROGERS, Primary Examiner

U.S. Cl. X.R.

210—60, 170, 196